Aug. 28, 1945.   J. H. WERNIG   2,383,575
AUTOMOBILE DOOR AND BODY ORNAMENTATION
Filed Sept. 11, 1941   5 Sheets-Sheet 1

INVENTOR.
JAMES H. WERNIG.
BY
Barnes, Kisselle, Laughlin & Raisch
ATTORNEYS.

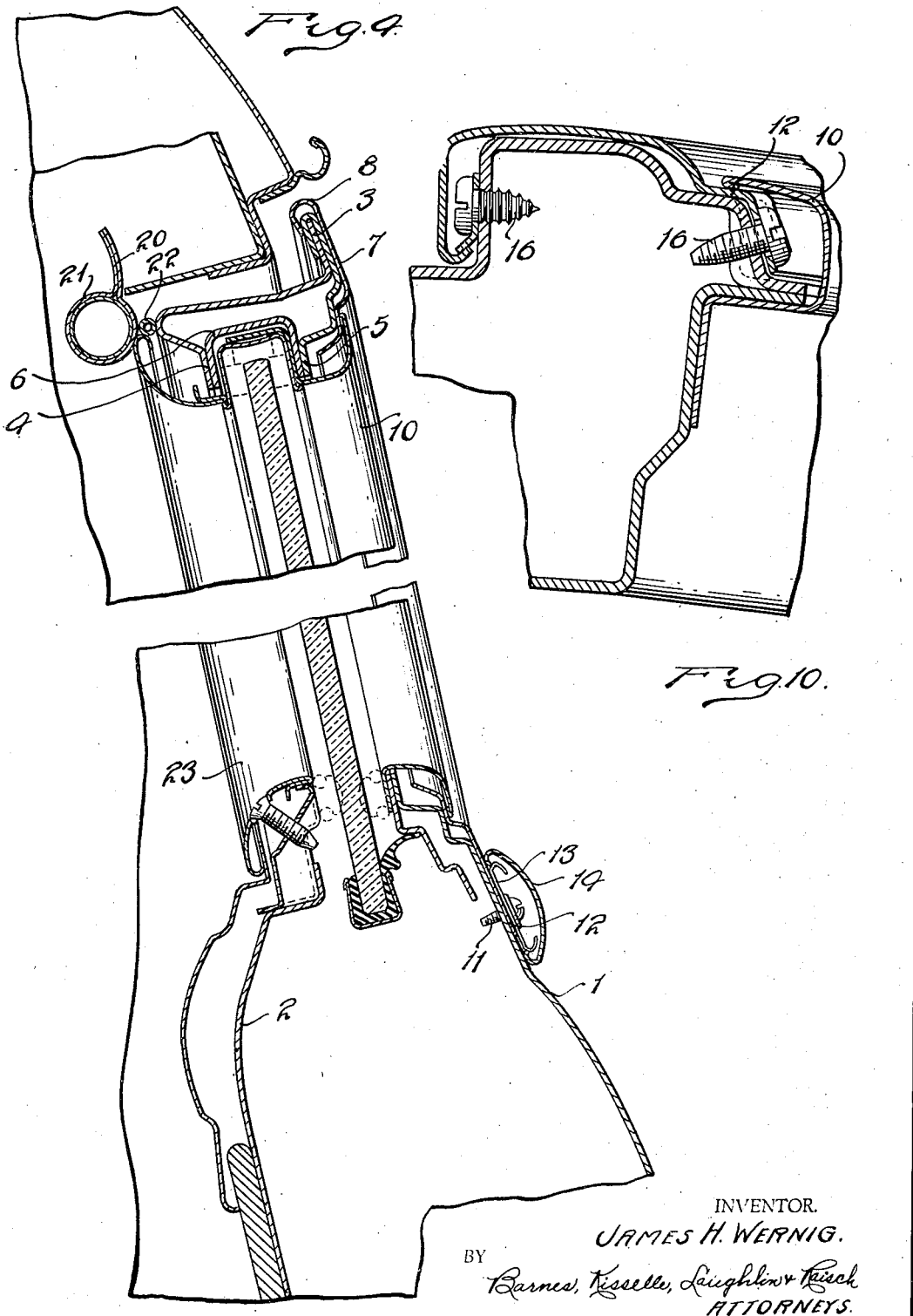

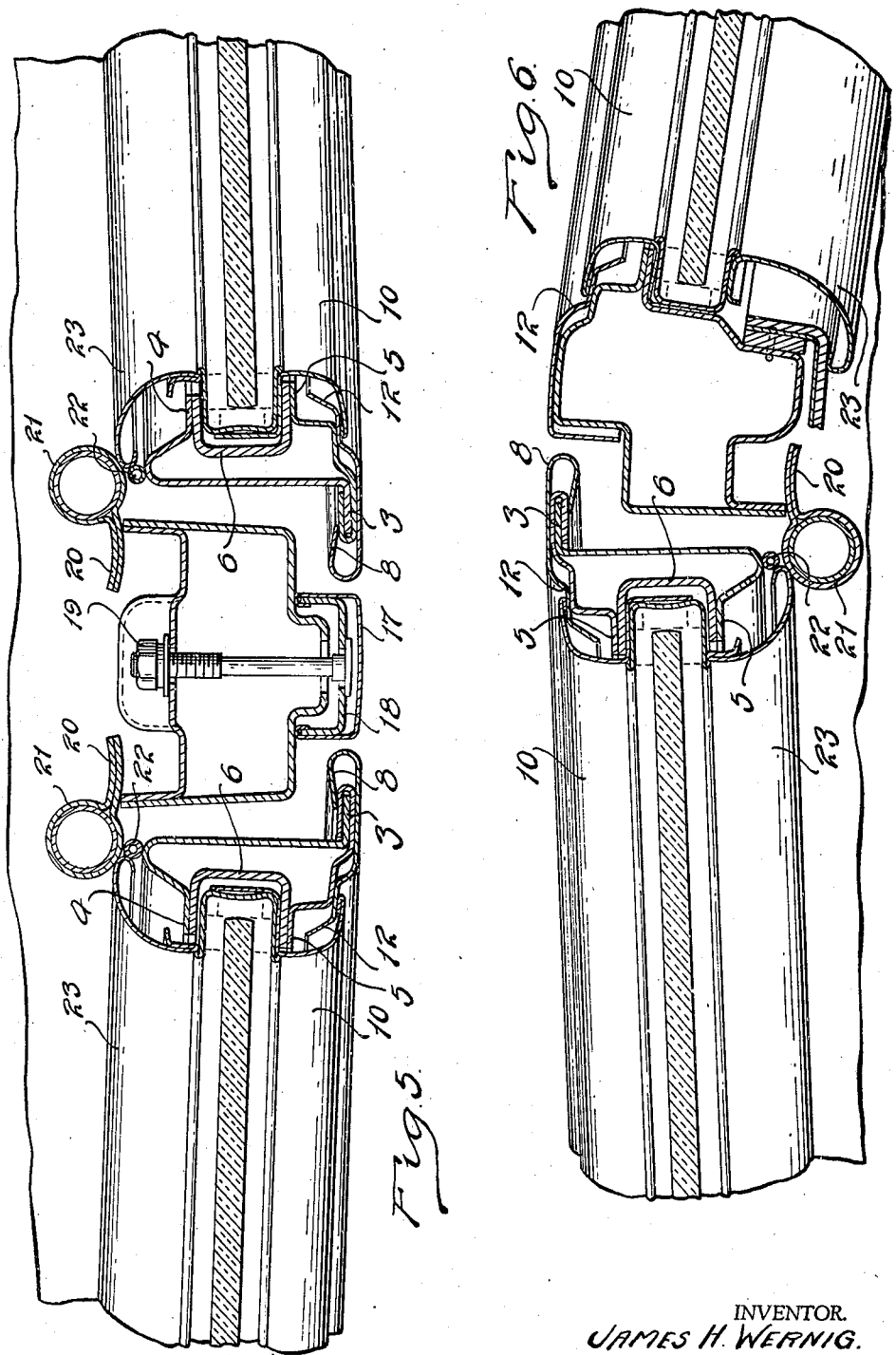

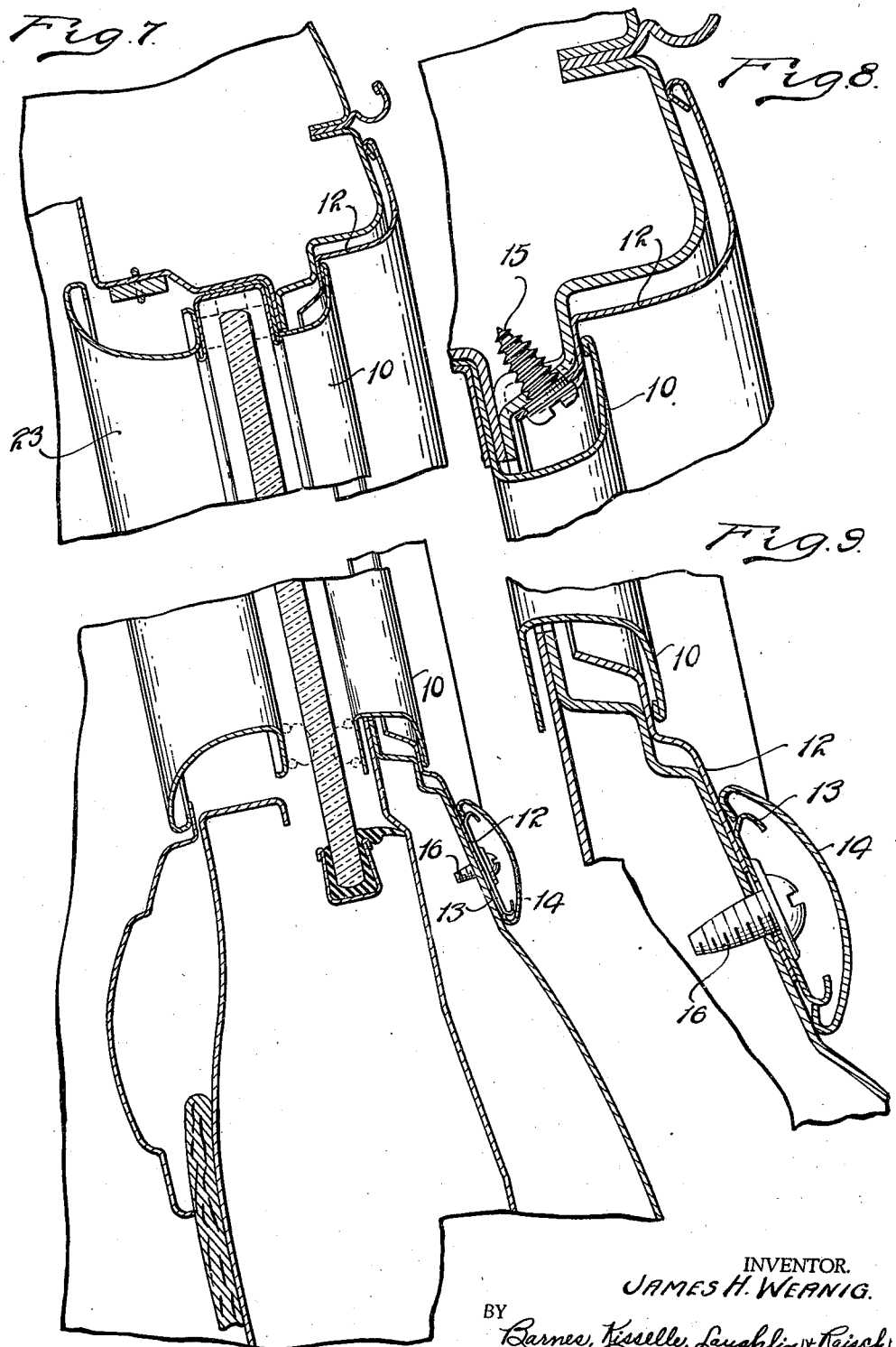

Patented Aug. 28, 1945

2,383,575

UNITED STATES PATENT OFFICE 2,383,575

AUTOMOBILE DOOR AND BODY ORNAMENTATION

James H. Wernig, Detroit, Mich., assignor to General Motors Corporation, Detroit, Mich., a corporation of Delaware Application September 11, 1941, Serial No. 410,429

8 Claims. (Cl. 296—44)

This invention relates to automobile door and body ornamentation. In some of the more expensive cars the top frame of the door has consisted of an ornamental chrome-plated channel frame which is only a channel window guide. This gives a pleasing appearance, but this form of door construction has its shortcomings. It is the object of the present invention to provide a door construction which is very similar to the conventional door construction, but which will be trimmed by a plated or stainless steel scalp which can be made to slide and fit over the top of the door construction. The center pillar of the body is also provided with an ornamental sheet metal scalp which harmonizes with the door frame scalp.

In the drawings:

Figs. 4, 5, 6 and 7 are sections taken on the corresponding lines of Fig. 1.

Fig. 8 is a cross section through the header of the rear quarter window showing how the scalp is secured in place.

Fig. 9 is a vertical section through the rear quarter window at the belt line showing how the scalp is secured at the bottom.

Fig. 10 is a section through the rear quarter pillar. (Refer to Fig. 4.)

The door is made up of two stampings, the outer panel 1 and the inner panel 2. These are provided with overlapped flanges 3, the outer one being folded around the flange of the inner panel and welded thereto. The inner edges of the outer and inner panel at the window opening are flanged as at 4 and 5 and these flanges are welded to the channel 6 which forms the window run support and the header strip support. This is old construction and nothing is claimed for it.

Figure 1:
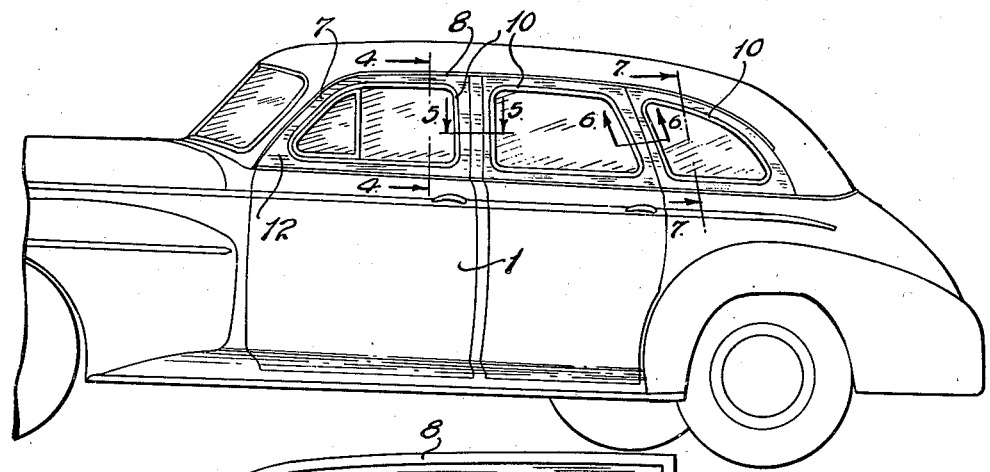
Fig. 1 is a side elevation of an automobile body equipped with the invention.
Figure 2:
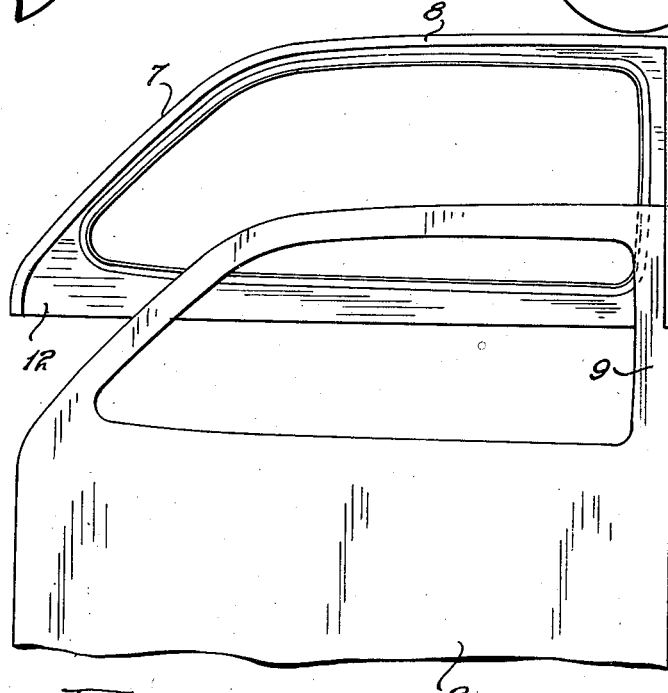
Fig. 2 is a detail view looking at the inside of the outer door panel showing how the ornamental scalp is partially separated from the door for clearness of disclosure.

7 designates a thin sheet metal scalp which may be made of stainless steel or which may be plain steel and plated as with chromium. This scalp forms a complete trapeziform frame as shown in Fig. 2. The scalp has an overlap flange 8 around the two sides and top. The manner of applying the one piece loop scalp is to hold it in position slightly higher than its final position and first engage that portion of the scalp which assembles with the vertical pillar. (See Fig. 5 at 8.) This is done by a horizontal movement parallel with the glass. The entire scalp is then moved toward the door until the horizontal top part and the slanting pillar part are overlapped. The scalp is then moved bodily downwardly and rearwardly toward the vertical pillar. The excessive amount of overlap between the scalp and the overlap flange along the vertical pillar allows this rearward movement without disengaging the scalp.

Figure 3:
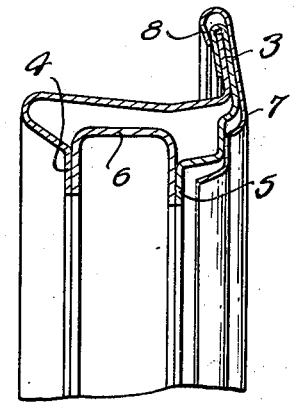
Fig. 3 is a vertical section through the top of the door showing the scalp in place.

After the scalp is in place the usual reveal molding 10 is hooked in the window channel and conceals the inner edge of the scalp frame. The scalp frame is held in place by screws 11 which pass through the lower skirt 12 of the scalp as shown in Fig. 3. These screws also pass through the belt molding retainer 13 and hold it in place. The belt molding 14 is then snapped over the edges of the retainer and this belt molding conceals the lower edge of the scalp frame.

The scalp frame for the rear quarter window cannot be slid into place and anchored by the tongue and groove or tenon and mortise arrangement, but has to be secured to the window opening frame by screws such as shown at 15 and 16 in Figs. 8 and 9 respectively.

A center pillar scalp 17 is slid over a channel 18 which forms the support for the scalp. This channel can be bolted to the center pillar by the bolts 19 which pass through the center pillar and which have heads that are located on the outside of the channel 18. Nuts 19 are located on the inner ends of the bolts and by tightening these nuts the bolts are held firmly in place. The trimming 20 conceals these bolts and nuts on the inside. This trimming 20 has at its edges the wind hose 21 which gives the necessary weather seal to the doors. An additional weather strip 22 is located at the edge of the garnish molding 23.

Figure 11:
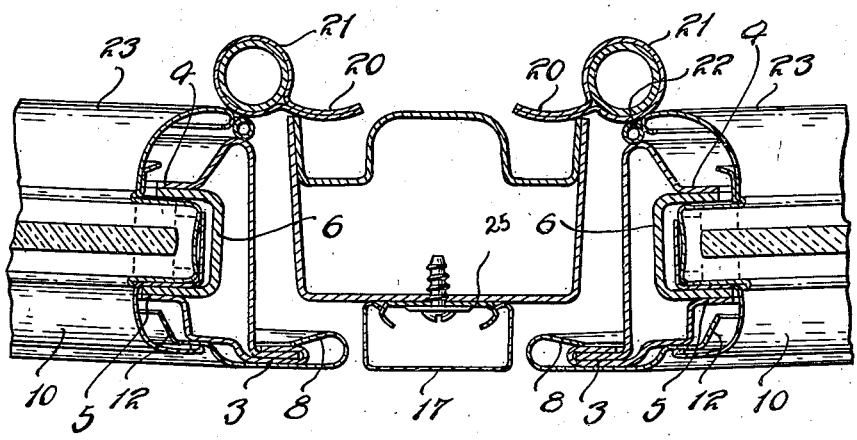
Figs. 11 and 12 are sections through the center pillar and adjoining door pillars showing modified forms of construction.
Figure 12:
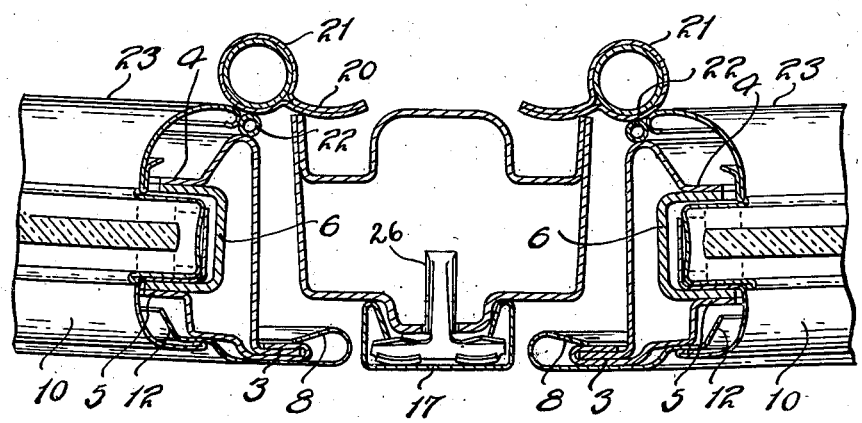

In the modified form of construction shown in Fig. 11, the scalp snaps over a retainer clip on channel 25. In the form of the invention shown in Fig. 12, the scalp is applied to the center pillar by means of spring clips designated 26.

What I claim is:

1. In automobile body construction, a sheet metal door having outer and inner panels having the edges of the outer panel folded over the edges of the inner panel at the top around the door window opening to form a door overlap flange, an ornamental scalp frame removably and slidably tenoned over said flange for trimming the outside of the door around the window opening, said frame surrounding the entire window opening and secured in place by the tenon engagement over the door overlap flange.

2. In automobile body construction, a sheet metal door having outer and inner panels secured together at the top around the door window opening to form a door overlap flange, an ornamental scalp frame removably and slidably tenoned over said flange for trimming the outside of the door around the window opening, and a reveal molding around the window opening and overlying the inner edge of said scalp to conceal the same.

3. In automobile body construction, a door having an outer and inner panel secured together at the top and provided with overlap flanges matched together, one folded over the other, and an ornamental scalp frame of sheet metal having on the two sides and top turned-in edges forming flanges which are slidable and tenoned over the overlap flanges to trim the exterior of the door around the window opening, said frame surrounding the entire window opening and secured in place by the tenon engagement over the door overlap flange.

4. In automobile body construction, a door having an outer and inner panel secured together at the top and provided with overlap flanges matched together, one folded over the other, and an ornamental scalp frame of sheet metal having on the two sides and top turned-in edges forming flanges which are secured over the overlap flanges to trim the exterior of the door around the window opening, the said scalp arranged to slide in place with the edges of the scalp hooking over the overlapped flanges in tenon and mortise arrangement, said frame surrounding the entire window opening and secured in place by the tenon engagement over the door overlap flange.

5. In an automobile body, a door having a trapeziform upper portion and overlap flanges and a sheet metal ornamental scalp frame of complementary shape with turned-in edges on the top and two sides forming a channel to hook over the overlap flanges at the top and two sides of the door, the said scalp being arranged to hook horizontally over the said overlap flange at one side and to be slid vertically into tongue and groove relation over the other overlap flanges of the trapeziform upper portion of the door, said tongue and groove engagement serving to form an interlock with the overlap flanges to hold the frame in place.

6. In automobile body construction, a sheet metal door having at the top a window opening and overlap flanges on the top and two sides of the door, said door frame being tapered from the belt line to the top forming a trapezium, and a sheet metal ornamental scalp having turned-in edges, said scalp forming an enclosed frame adapted to slide over the tapered top of the door in tongue and groove relation with the flanges on the two sides and the top of the door, the tongue and groove engagement forming an interlock to hold the frame in place on the door.

7. In automobile body construction, a sheet metal door having at the top a window opening and overlap flanges on the top and two sides of the door, said door frame being tapered from the belt line to the top forming a trapezium, and a sheet metal ornamental scalp having turned-in edges, said scalp forming an enclosed frame adapted to slide over the tapered top of the door in tongue and groove relation, this to form a holding interlock with the flanges on the two sides and the top, the bottom portion of the scalp frame forming a skirt.

8. In automobile body construction, a sheet metal door having at the top a window opening and overlap flanges on the top and two sides of the door, said door frame being tapered from the belt line to the top forming a trapezium, and a sheet metal ornamental scalp having turned-in edges, said scalp forming an enclosed frame adapted to slide over the tapered top of the door into tongue and groove relation with the flanges on the two sides and the top, the bottom portion of the scalp frame forming a skirt, screws passing through said skirt, and a molding retainer secured by said screws, said skirt and retainer being secured to the door, a belt molding secured over the edge of the skirt and sprung on to the retainer.

JAMES H. WERNIG.